United States Patent [19]

Artzer

[11] Patent Number: 4,966,781
[45] Date of Patent: Oct. 30, 1990

[54] METHOD OF MAKING A FOOD PRODUCT

[75] Inventor: Richard Artzer, San Clemente, Calif.

[73] Assignee: Pizza Stick-Ups Limited Partnership, Forest Park, Ill.

[21] Appl. No.: 376,962

[22] Filed: Jul. 6, 1989

Related U.S. Application Data

[63] Continuation of Ser. No. 96,552, Sep. 14, 1987, abandoned.

[51] Int. Cl.⁵ ................................................ A23L 1/00
[52] U.S. Cl. ...................................... 426/280; 426/90; 426/91; 426/92; 426/132; 426/134; 426/283; 426/284; 426/499; 426/524
[58] Field of Search ...................... 426/90, 92, 91, 280, 426/281, 283, 284, 499, 513, 132, 134, 524

[56] References Cited

U.S. PATENT DOCUMENTS 3,234,585  2/1966  Synder ................................. 426/513
3,656,968  4/1972  Allen .................................... 426/283

Primary Examiner—Donald E. Czaja
Assistant Examiner—Mary S. Mims
Attorney, Agent, or Firm—Dvorak & Traub

[57] ABSTRACT

This invention relates to a food product in the nature of pizza in which meat and condiments in a dough shell or casing are secured to a stick-like handle, and in particular to the method of preparing such an edible product by forming and cooking in a form or mold and using a heat transfer prong inserted into the product to permit cooking of ingredients from within as well as from the outer surfaces of the product.

1 Claim, 2 Drawing Sheets

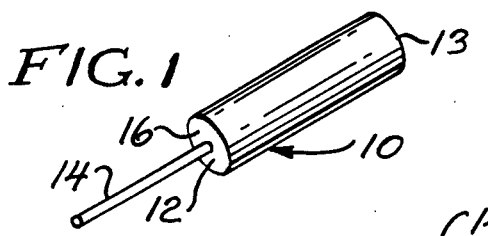
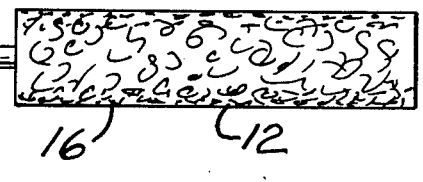
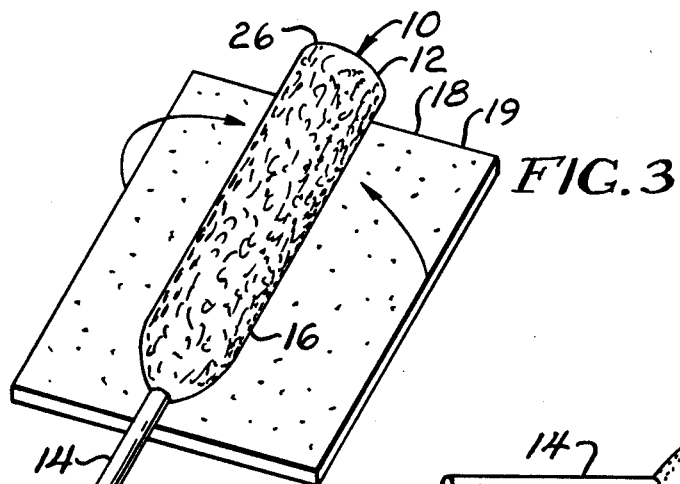
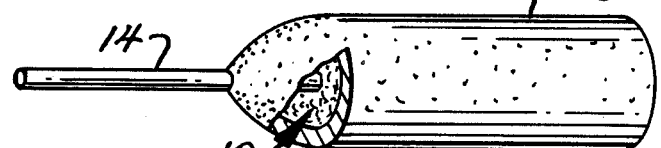
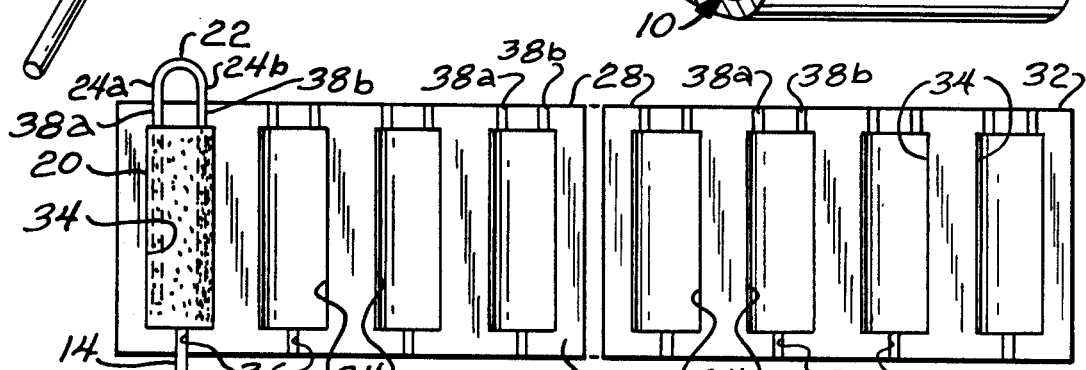
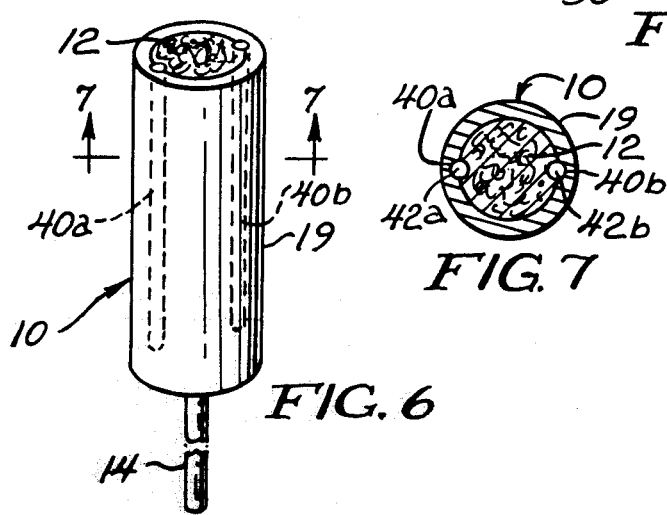
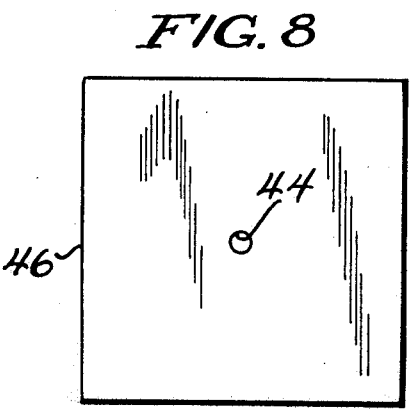

METHOD OF MAKING A FOOD PRODUCT

This is a continuation of co-pending application Ser. No. 07/096,552 filed on Sept. 14, 1987, now abandoned.

BACKGROUND OF THE INVENTION

The present invention relates to a food product and method of making the food product.

Before the present invention, a food product such as a so-called corn dog is known having an inner hot dog containing a handle and an outer edible cover. Although the use of such corn dogs is widespread, the product is limited to the inner core of a hot dog, and also it has been found difficult to place a condiment, such as mustard, on the corn dog without creating a possible mess for the consumer.

SUMMARY OF THE INVENTION

The present invention relates to an improved food product and a method of making the product.

The product of the present invention comprises, an edible inner core having an outer surface. The product has an outer crust having an inner surface adjacent the outer surface of the core and covering a substantial portion of the core.

A feature of the present invention is that the product has an elongated cavity extending along the core adjacent the surfaces of the core and crust and communicating with an outer opening of the product.

Another feature of the invention is that a condiment may be placed in the cavity.

Still another feature of the invention is that the product may be provided with the condiment in a simplified manner.

Yet another feature of the invention is that the cavity retains the condiment while preventing a possible mess to the consumer.

A feature of the invention is the provision of a method for making the product of the present invention.

Further features will become more fully apparent in the following description of the embodiments of this invention and from the appended claims.

DESCRIPTION OF THE DRAWINGS

In the drawings:

FIG. 1 is a perspective view of a food product in a tube;

FIG. 2 is a perspective view of the food product;

FIG. 3 is an elevational view of a sheet of dough being wrapped about the food product;

FIG. 4 is a perspective of a tube for the food product of FIG. 3;

FIG. 5 is a plan view of a mold for heating the food product of FIG. 3 and showing a prong being placed in the product;

FIG. 6 is a perspective view of the food product after being removed from the mold of FIG. 5;

FIG. 7 is a sectioned view taken substantially as indicated along the line 7—7 of FIG. 6; and FIG. 8 is a plan view of a wrapper for the food product of FIG. 6;

DESCRIPTION OF THE PREFERRED EMBODIMENTS

Figure 9:
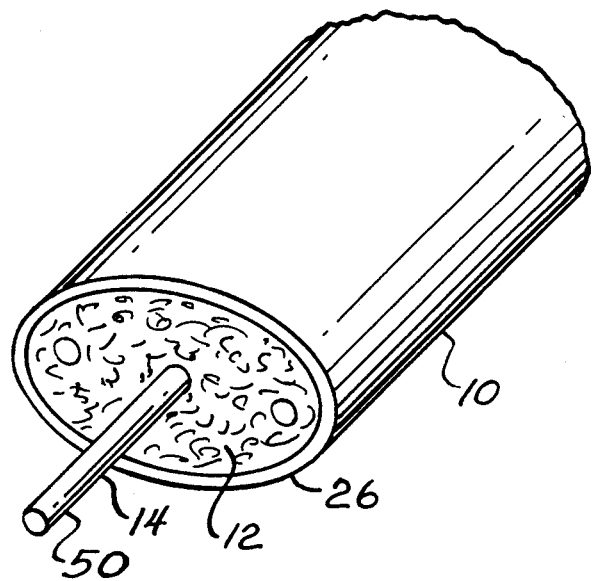
FIG. 9 is a fragmentary perspective view of another embodiment of the food product of the present invention.

Referring now to FIG. 1, there is shown a food product generally designated 10 having an elongated edible inner core 12, such as ground beef for hamburger, sausage for pizza or skinless sausage, received in a metallic outer tube 13. As shown, the core 12 has a handle 14, such as wood, extending from one end 16 of the core 12. The core 12 is cooked in the tube 13 in order to remove fat and grease, and solidify and firmly attach the core 12 to the handle 14. After the core 12 has been sufficiently cooked, the tube 13 is removed from the core 12 resulting in the initial food product shown in FIG. 2.

With reference to FIG. 3, a sheet 18 of dough is then wrapped about the core 12 to form a cover 19 for the core 12, and the wrapped core 12 is placed in a metallic outer tube 20 shown in FIG. 4.

With reference to FIG. 5, a metallic prong 22 having a pair of spaced elongated rods 24a and 24b is placed in the product 10 with the rods 24a and b extending from an outer surface of the product 10 at the other end 26 of the product 10, and with the rods 24a and b being located adjacent the interface between the cover 19 and core 12 along a substantial length of the core 12.

A mold 28 for the product 10 is shown in FIG. 5, having a first part 30 and a complimentary second part 32. The parts 30 and 32 have a cavity 34 to receive the product 10 and tube 20, a first groove 36 communicating with the cavity 31 to receive the handle 14, and a pair of second grooves 38a and 38b to receive a portion of the prong rods 24a and b. As will be apparent, a plurality of covered food products 10 may be placed in the mold 28 at a single time. The first and second parts 30 and 32 of the mold 28 are closed, and the mold 28 is heated to bake the food product at a suitable temperature and sufficient length of time in order to bake the product 10. During this time, the metallic prong 22 conducts heat to promote the baking process more rapidly, and the tube 20 conducts heat to the dough in order to form the dough into a tight envelope which will prevent emergence of the core 12 and below described condiments through the outside wall of the dough.

After the cooking has been completed, the parts 30 and 32 of the mold 28 are separated, and the prong 22 is removed resulting in the food product 10 shown in FIGS. 6 and 7. This food product 10 has an outer crust formed by the cover 19, and a pair of elongated cavities 40a and 40b extending from outer openings at the other end 26 of the product or sandwich 10. A suitable condiment 42a and 42b such as mustard, catsup, or onion, may be readily placed in the cavities 40a and 40b through use of dispensers known to the art or other manner, such that the cavities 40a and 40b prevent spreading of the condiment and possible mess to the consumer.

The handle 14 of the product 10 may be placed through an opening 44 of a wrapper 46 shown in FIG. 8, and the wrapper 46 may be closed about the product 10 to facilitate consumption of the product 10.

According to a method of making the product of the present invention, an edible core is provided, an edible cover is placed over a substantial portion of the core, an elongated rod is placed in the product adjacent an interface of the core and cover at a location extending from an outer surface of the product, the core and cover are heated with the rod in place, and the rod is removed from the product to form a cavity in the product.

Another embodiment of the food product 10 of the present invention is illustrated in FIG. 9, in which like reference numerals designate like parts. In this embodiment, the food product 10 has a generally oval cross-sectional shape. Also, in this embodiment, the handle 14 has an outer end 50 which projects past the other end 26 of the food product for a purpose which will be described below. The food product 10 of FIG. 9 may or may not have the cavities 40a and b. In other respects, the food product 10 is similar to the one previously described in connection with FIGS. 1-8.

Figure 10:
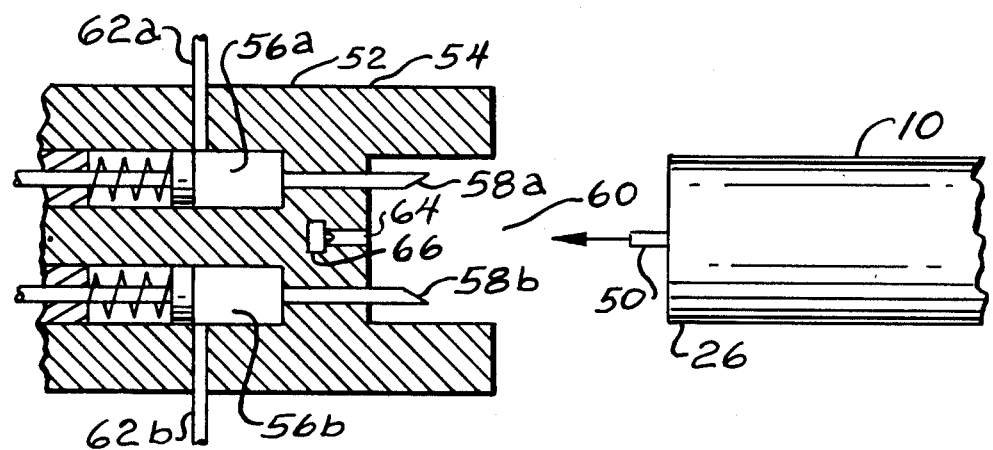
FIG. 10 is a diagramatic view of a device for injecting a condiment into the food product of FIG. 9.

A device 52 for injecting a condiment into the food product 10 is illustrated in FIG. 10. The device 52 has a body 54 having a pair of cavities 56a and 56b communicating with a pair of respective injecton nozzles 52a and 58b in a cut-out 60 of the body 54 to receive the other end 26 of the food product 10. The device 52 has a pair of tubes 62a and 62b communicating with the cavities 56a and b for passage of a heated condiment, such as chesse, into the cavities 56a and b and through the nozzles 58a and b. The device 52 has a bore 64 to receive the outer end 50 of the handle 14, and a switch 66 in the bore 64 which activates when the outer end 50 of the handle 14 is placed fully into the bore 64.

In operation of the device 52, the other end 26 of the food product 10 is placed in the cut-out 60 until the outer end 50 of the handle activates the switch 66 when the sharp tapered nozzles 68a and b are received in the other end 26 of the food product 10. When the switch 66 is activated, the device 52 in response passes the heated condiment through the nozzles 58a and b into the food product 10 in order to automatically inject the condiment into the food product 10. In this embodiment, the food product is free of the cavities 40a and b.

The foregoing detailed description is given for clearness of understanding only, and no unnecessary limitations should be understood therefrom, as modifications will be obvious to those skilled in the art.

What is claimed is:

1. A method of making a food product, comprising the steps of:

compacting food ingredients into a tube to form an elongated edible core;

inserting a stick-like handle into the food ingredient in the tube and allowing the handle to extend out from one end of the core;

cooking said edible core to remove fat and grease and to solidify the contents thereof for good adhesion with said stick-like handle;

removing the cooked food edible core with the stick-like handle;

placing the edible core on a sheet of dough;

placing a metallic prong having a pair of spaced elongated rods abutting said edible core to accelerate the cooking of the food product, said metallic prong extending out of said edible core at an end opposite to the stick-like handle;

wrapping said sheet of dough about a portion of said stick-like handle and about said elongated rods and said edible core;

placing said wrapped edible core in a closed mole;

heating sufficiently said wrapped edible core with the rods in place to bake said wrapped edible core to form a product;

opening said mold and removing said prong from said product to form a pair of spaced cavities in said product;

removing said baked product from the mold; and filling said cavities with flavoring material.

* * * * *